Feb. 20, 1968  R. WILDBOLZ ETAL  3,369,346
APPARATUS AND METHOD FOR DETECTING COMBUSTION
PRODUCTS IN A PNEUMATIC CONVEYOR
Filed Sept. 16, 1966
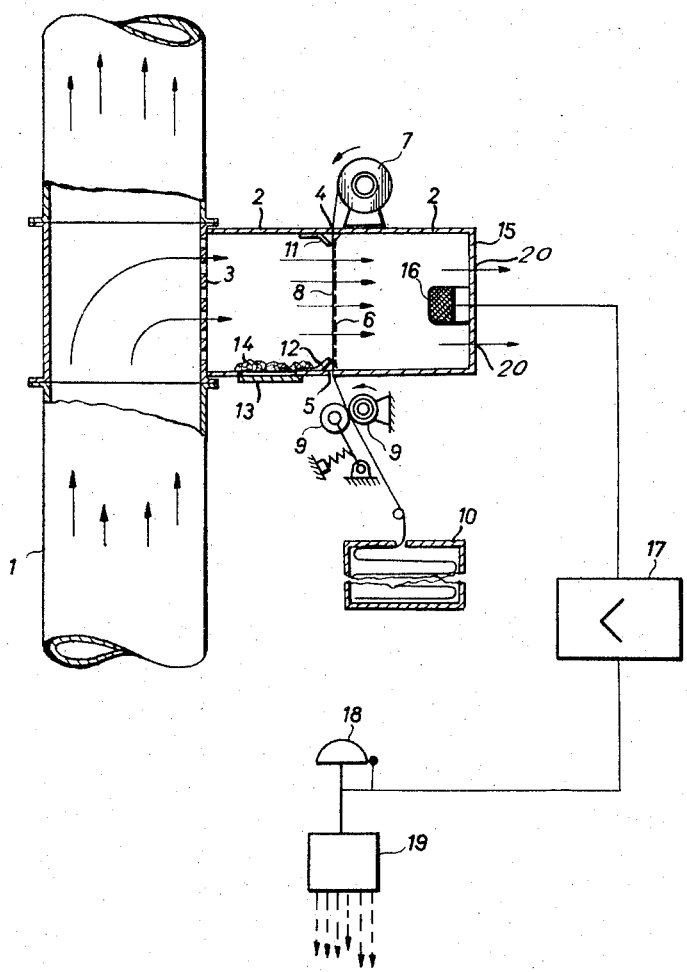
INVENTORS
RUDOLF WILDBOLZ
DANIEL HANSELMANN
BY
*Kenyon & Kenyon*
ATTORNEYS United States Patent Office 3,369,346
Patented Feb. 20, 1968

3,369,346
APPARATUS AND METHOD FOR DETECTING COMBUSTION PRODUCTS IN A PNEUMATIC CONVEYOR
Rudolf Wildbolz and Daniel Hanselmann, Winterthur, Switzerland, assignors to Maschinenfabrik Rieter A.G., Winterthur, Switzerland, a corporation of Switzerland
Filed Sept. 16, 1966, Ser. No. 580,110
Claims priority, application Switzerland, Sept. 22, 1965, 13,171/65
11 Claims. (Cl. 55—97)

ABSTRACT OF THE DISCLOSURE

An ionization fire alarm is used to detect the presence of combustion particles in the flow of fibers in a pneumatic conveyor. A perforated wall between the conveyor and chamber retains the fiber in the conveyor while a filter is disposed in the chamber to retain the dust particles in the stream of air drawn off from the conveyor before reaching the ionization fire alarm.

---

This invention relates to an apparatus and method for detecting combustion particles in a pneumatic conveyor. More particularly, the invention relates to an apparatus and method for detecting combustion particles such as smoke particles, in a pneumatic conveyor operating at superpressure and containing dust.

Pneumatic conveyors have been used in spinning plants to convey fibers, such as cotton, for processing when the fibers have achieved a certain degree of opening. In addition, pneumatic cotton conveying conduits have been used to feed the cards of a carding machine. Further, since natural fibers, such as cotton, etc., are easily combustible, the installation of fire extinguishing apparatus has been required in these pneumatic conduits. However, while automatic fire alarms have been proposed for effecting prompt and efficient supply of fire extinguishing agents, a reliable alarm has not been assured when dust is present. Thus, ionization fire alarms which are generally suitable for the purposes intended have not been used.

Generally, this invention allows the use of ionization fire alarms for detecting combustion particles, in a conveyor agent passing through pneumatic conveyors by providing an apparatus which is easily installed in a pneumatic conveyor. The apparatus includes a chamber having upper and lower walls and a perforated backwall connecting the upper and lower walls. The apparatus is connected to a pneumatic conveyor through a perforated wall between the chamber and conveyor. The perforated wall permits the diversion of a portion of the conveyor agent into the chamber while filtering out any solid bodies such as transported fibers. Preferably, the chamber is at a lower pressure than the pressure in the conveyor so as to facilitate diversion of the portion of the conveyor agent.

The apparatus also includes a filter means interposed in the chamber between the upper and lower walls for filtering the diverted conveyor agent. The filter means includes a filter paper which continuously moves through the chamber transverse to the path of travel of the diverted conveyor agent for collecting an increasing layer of dust from the conveyor agent while allowing for the passage of any combustion particles through an upper zone, that is, in the area where the filter paper initially enters the chamber, before an accumulation of a thicker layer of dust. In order to aid in the support of the filter paper, a vertical screen is positioned in the chamber adjacent the moving filter paper.

In addition, a detection means such as an ionization chamber is mounted on the backwall of the chamber to detect the presence of combustion particles in the conveyor agent passing from the filter means past the ionization chamber and through the backwall. The ionization chamber upon detecting the presence of combustion particles will emit a signal which can be used to sound or otherwise actuate a fire alarm and/or fire extinguishing system.

Briefly, the method of the invention includes a diversion of a portion of the conveyor agent in a pneumatic conveyor into a confined path. Next, the diverted conveyor agent is filtered through a filter means moving transverse to the confined path to collect an increasing layer of dust along the advancing length of the filter means and to pass combustion particles through a zone of the filter means having a minimum layer of dust. Thereafter, the filtered conveyor agent is tested as by an ionization chamber for the presence of combustion particles.

Once the detection of combustion particles is made a suitable signal is emitted to indicate such or to actuate fire extinguishing systems.

Accordingly, it is an object of the invention to provide a pneumatic conveyor with an ionization fire alarm.

It is another object of the invention to provide a pneumatic conveyor with an apparatus for detecting combustion particles in the conveyor agent of the conveyor.

It is another object of the invention to provide a continuously moving filter means in a combustion particle detection apparatus for passing combustion particles therethrough while accumulating an increasing layer of dust thereon.

It is another object of the invention to provide an apparatus and method of detecting combustion particles in a pneumatic conveyor operating at a superpressure which substantially eliminates the presence of dust from a detection means.

The figure illustrates a schematic part sectional view of a detection apparatus of the invention.

Referring to the drawing, a conduit 1 conveys fibers and/or fiber agglomerations by means of a pneumatic conveyor agent, for example, air at a slight superpressure. The air may also contain impurities, such as, a dust of shell particles etc., in addition to the fibers. Since the fibers as well as the impurities are combustible, the conveyor agent will also carry along any combustion particles, such as smoke particles, etc. which may occur in case of a fire due to any reason.

A chamber 2 is connected at a suitable location to the conduit 1 through a perforated wall 3 which affords an exchange of gas together with the dust contained therein and which prevents escape of fibers from the conduit 1. The chamber 2 has upper and lower horizontally disposed walls which are provided with slots 4 and 5, respectively, and a solid vertical screen 6 which is placed on the far side of the slots 4, 5 with respect to the conduit 1 between the walls. A roll 7 of fine filter paper 8 is mounted on the upper wall adjacent the slot 4 in front of the screen 6. The paper 8 is drawn from the roll 7 into the chamber 2 through the slot 4, pulled downwardly adjacent to the screen 6 which acts as a support for the paper, and drawn from the chamber through the slot 5 in the lower wall by a pair of rollers 9 one of which is driven. The rollers 9 are placed below the chamber 2 for withdrawing the filter paper 8 and depositing it in a container 10 which must be periodically emptied. In order to enclose the chamber 2 at the slots 4, 5, seals 11 and 12 are provided in front of the filter paper 8 at the upper and lower wall, respectively, of the chamber 2 adjacent the slots 4 and 5. The lower seal 12 also serves as a wiper for the dust deposited on the filter paper 8.

The lower wall of the chamber 2 is apertured and covered by a cover 13 which is removable for the removal of accumulated dust 14. A backwall 15 which is provided with apertoures 20 to permit passage of the conveyor agent closes the right portion of the chamber 2 as viewed. A conventional ionization chamber 16 which responds to the presence of combustion particles in the conveying agent is mounted on the backwall 15 to project into the chamber in the path of the conveying agent. The ionization chamber 16 produces an electrical signal in response to the presence of combustion particles which is conducted to an amplifier 17 connected to an alarm device 18 to indicate the presence of combustion particles and which may actuate, for example, a sprinkler system 19.

In operation, a portion of the air which flows under pressure through the conduit 1 is diverted through the perforated wall 3 into the chamber 2 due to the lower ambient pressure. The diverted air is filtered in passing through the traveling fine filter 8 and directed past the ionization chamber 16. The perforated wall 3 while not permitting passage of any fibers allows passage of any coarse impurities, dust particles and the like with the diverted or branched off air. Shortly after entering the chamber 2, the fine filter 8 begins to collect a layer of dust. Initially, while a small amount of dust is collected, the particles which may be the result of combustion and which are heavier and larger than combustion gas molecules pass through the upper zone of the fine filter 8. Thereafter, when the layer of collected dust thickens as the filter 8 continues into the chamber, these particles cannot pass through the filter and are caught by the thicker layer of dust. Since these combustion particles are smaller than most of the dust particles and can pass through the upper zone of the filter 8, they are present in the right part of the chamber 2 (as viewed) in greater quantity than normal dust particles and thus suffice to reliably actuate the ionization chamber 16 which must be passed in order to reach the outside. Upon reaching a certain concentration adjacent the ionization chamber 16 such that the ionization current is changed, an electric pulse originates in the chamber 16. This pulse is then transmitted to and amplified in the amplifier 17 for actuating the alarm device 18 and other suitable apparatus.

The present invention thus provides a method whereby in the case of a fire the presence of combustion particles, for example smoke particles, is discovered in a conveying conduit containing a conveyor agent at superpressure which agent contains dust and matter to be conveyed, such as fibers. Since the dust and solid bodies are retained by the traveling filter and the combustion particles pass through the filter where the dust deposited thereon is relatively thin, there is very little or no dust which may interfere with the operation of the ionization chamber. The ionization chamber thus chiefly receives combustion particles.

Having thus described the invention, it is not intended that it be so limited as changes may be readily made therein without departing from the scope of the invention. Accordingly, it is intended that the subject matter described above and shown in the drawings be interpreted as illustrative and not in a limiting sense.

What is claimed is:

1. A method for detecting combustion products in a pneumatic conveyor agent conveying fibers under a pressure above atmospheric pressure through a pneumatic conveyor comprising the steps of
diverting a portion of the conveyor agent from the pneumatic conveyor into a confined path,
filtering the fibers out of said diverted portion of the conveyor agent,
subsequently filtering said diverted portion of the conveyor agent through a filter means moving in one direction continuously transversely to the confined path for collecting an increasing layer of dust on the filter means under a translatory motion in the direction of movement of the filter means and for the passage of combustion particles through a zone of the filter means having a minimum layer of dust thereon, and
thereafter detecting the presence of combustion particles in the filter conveyor agent passing from the filter means.

2. A method as set forth in claim 1 wherein said step of diverting a portion of the conveyor agent is performed at a pressure less than the pressure in the pneumatic conveyor.

3. In combination with a conduit for the passage of a pneumatic conveyor agent and fibers therethrough, an apparatus for detecting combustion particles in the pneumatic conveyor agent passing through said conduit, said apparatus comprising an enclosed chamber connected to said conduit at an intermediate point thereof to receive a flow of pneumatic conveyor agent from said conduit, said chamber having a perforated backwall for passage of said flow of pneumatic conveyor agent outwardly thereof, a perforated wall between said conduit and said chamber in the path of said flow for retaining the fibers in said conduit, a screen disposed in said chamber in the path of said flow and in spaced relation to said perforated wall and said perforated backwall to separate said chamber into a dust-containing portion and a dust-free portion, a filter means disposed transversely of said flow in said chamber between said perforated wall and said screen for filtering of said flow therethrough towards said perforated backwall, said filter means being continuously movable transversely through said chamber from one position to a second position for collecting an increasing layer of dust under translatory motion thereon and for the passage of combustion particles through a zone of said filter means nearest said one position, and means mounted on said perforated backwall within said chamber in the path of said flow for determining the presence of combustion particles in said flow.

4. The combination as set forth in claim 3 wherein said means is an ionization chamber.

5. The combination as set forth in claim 4 which further comprises an alarm operably connected to said ionization chamber for actuation upon detection of combustion particles in said chamber.

6. The combination as set forth in claim 3 wherein said filter means is a fine filter paper.

7. The combination as set forth in claim 6 which further comprises a pair of rollers mounted below said chamber for withdrawing said filter paper through said chamber.

8. The combination as set forth in claim 7 which further comprises means for receiving said withdrawn filter paper.

9. The combination as set forth in claim 6 wherein said chamber includes an upper wall at said one position and a lower wall at said second position and wherein each of said upper and lower walls of said chamber includes a slot for passage of said fine filter paper therethrough and said chamber further includes a seal means mounted on each of said upper and lower walls adjacent each of said slots for enclosing said chamber.

10. The combination as set forth in claim 9 wherein said seal means on said lower wall is positioned adjacent said fine filter paper to wipe dust from said fine filter paper under translatory movement of said fine filter paper.

11. The combination as set forth in claim 10 wherein said chamber further includes a removable cover in said lower wall adjacent said seal means on said lower wall whereby accumulated dust can be removed from said chamber upon removal of said cover from said chamber.

(References on following page)

References Cited

UNITED STATES PATENTS

| | | | |
|---|---|---|---|
| 1,982,639 | 12/1934 | Christofferson | 55—354 X |
| 2,119,978 | 6/1938 | Wolthuis et al. | 55—354 |
| 2,133,931 | 10/1938 | Walker et al. | 55—354 |
| 2,218,453 | 10/1940 | Mickle | 55—354 |
| 2,307,602 | 1/1943 | Penney et al. | 73—422 X |
| 2,523,721 | 9/1950 | Russell et al. | 73—23 |
| 2,752,003 | 6/1956 | Hersey et al. | 55—354 X |
| 2,857,978 | 10/1958 | Lenger | 55—270 X |
| 2,901,626 | 8/1959 | Becker | 55—354 X |
| 2,932,966 | 4/1960 | Grindell | 73—28 |
| 2,978,582 | 4/1961 | Schoepe et al. | 73—28 X |
| 3,149,279 | 9/1964 | Guild | 73—23 X |
| 3,201,272 | 8/1965 | Forshee | 55—354 X |
| 3,262,106 | 7/1966 | Crawford et al. | 73—28 X |

FRANK W. LUTTER, *Primary Examiner.*

HARRY B. THORNTON, *Examiner.*

D. TALBERT, *Assistant Examiner.*